United States Patent Office 3,144,468
Patented Aug. 11, 1964

3,144,468
α-CYANATOMETHOXY ETHERS
Fred W. Hoover and Halsey B. Stevenson, Wilmington, Del., assignor to E. I. du Pont de Nemours and Company, Wilmington, Del., a corporation of Delaware
No Drawing. Filed Nov. 10, 1961, Ser. No. 151,446
10 Claims. (Cl. 260—345.9)

This invention relates to, and has as its principal object, the provision of new compositions of matter.

The new α-cyanatomethoxy ethers of this invention are of the formula:

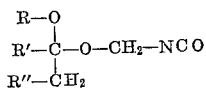

wherein R is a saturated hydrocarbon group of up to 18 carbons (1–18, inclusive); R′ and R″, which may be the same or different, are hydrogen or saturated hydrocarbon of up to 18 carbons; and R and R″ may be joined together to form with the oxygen a cyclomonooxaalkyl group of 5–6 ring members and a total of up to 18 carbons (including the carbons in R′ but not those in the —OCH₂NCO group). Preferably R is alkyl of up to 18 carbons; R′ is hydrogen; and R″ is hydrogen, or taken together with R, forms with the oxygen a cyclomonooxaalkyl group of 5–6 ring members and a total of up to 6 carbons.

The compounds of the invention are prepared by reacting hydroxymethyl isocyanate with a monoethylenically unsaturated hydrocarbon ether of the formula:

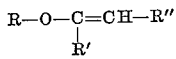

wherein R, R′ and R″ are as defined as above. (Hereinafter, the ethylenically unsaturated hydrocarbon ether will sometimes be referred to as the unsaturated ether.)

Hydroxymethyl isocyanate is unstable at room temperature and must be handled with the care exercised in handling any material capable of undergoing a rapid exothermic reaction. At temperatures below 0° C., particularly below −15° C., hydroxymethyl isocyanate is stable and can be handled as an ordinary chemical. Thus, it is preferred to charge this reactant to a reactor which contains the unsaturated ether (in admixture with a catalyst and reaction medium, if any) and which has been cooled to a temperature below about −15° C., e.g., −25° C. It is convenient to cool the reactor to about −78° C., this being the temperature of a solid carbon dioxide-acetone bath. However, the process of the invention can be conducted at 15° C. or even higher provided, of course, that suitable heat and pressure resistant equipment is employed.

Usually, the reaction between the unsaturated ether and hydroxymethyl isocyanate is conducted in the presence of a catalytic amount of a strong acid at atmospheric pressure because under these conditions the reaction produces good yields of desired product, with minimum complications in equipment design. If desired, however, the reaction can be carried out under autogenous pressure, but this does not lead to any practical advantages and does require the use of more complicated equipment.

A strong acid is preferably used as a catalyst to improve the yield of α-cyanatomethoxy ether. By a strong acid is meant any acid having a pKa value of not more than 3, e.g., aryl sulfonic acids and sulfuric, hydrochloric, glycol/boric, and metaphosphoric acids. The preferred strong acid catalysts are the aryl sulfonic acids, particularly those containing simple aryl groups, e.g., p-toluenesulfonic and benzenesulfonic acids.

The amount of catalyst used is that which is sufficient to catalyze the reaction at reaction temperature. This amount will usually be at least 0.0001% by weight of the hydroxymethyl isocyanate; however, amounts in excess of 5% by weight offer no practical advantage. Preferably, the amount of strong acid is in the range of 0.001 to 2% by weight of the hydroxymethyl isocyanate.

Although the reaction between the unsaturated ether and hydroxymethyl isocyanate involves equimolar amounts of each reactant, the ratio of these reactants is not critical. In practice, it is desirable to use the unsaturated ether in an amount sufficient for it to function both as a reactant and as a reaction medium. Usually, the mole ratio of monoethylenically unsaturated ether to hydroxymethyl isocyanate is at least 1.5:1, preferably in excess of 2:1.

A normally liquid organic compound, which is inert to the reactants and reaction products, can also be included in the charge, if desired, to function as a reaction medium. The amount of such medium is not critical and it can equal or exceed the weight of the hydroxymethyl isocyanate by ten or more fold. Suitable inert liquid organic media are diethyl and dipropyl ethers, tetrahydrofuran, dioxane, 1,2-dimethoxyethane, cyclohexane, methylcyclohexane, and the like. It is to be understood, however, that neither an excess of monoethylenically unsaturated ether nor of the inert liquid organic medium is essential to the process of this invention.

In a typical method for preparing the compounds of this invention, a reactor is charged with the monoethylenically unsaturated ether and from 0.0001 to 5% by weight of a strong acid catalyst, e.g., an aryl sulfonic acid, and the charge is cooled to between −78° C. and +15° C. To the cooled reaction mixture, there is then added hydroxymethyl isocyanate, the mixture allowed to warm to room temperature (ca. 25° C.) over a period of from one to three hours, and allowed to stand at room temperature for from one to ten days. The desired product is recovered by distillation under reduced pressure, or by other methods known to those skilled in the art.

Examples of monoethylenically unsaturated ethers which can be used in the process of this invention are methyl vinyl ether, ethyl vinyl ether, n-octyl vinyl ether, α,β-dihydrofuran, γ-methyl-α,β-dihydrofuran, propenyl butyl ether, cyclohexyl vinyl ether, methyl cyclohexyl vinyl ether, isopropenyl methyl ether, propenyl ethyl ether, and the like.

The examples which follow illustrate but do limit this invention. Example IA illustrates the preparation of the hydroxymethyl isocyanate used as a reactant in Examples IB and II.

EXAMPLE I

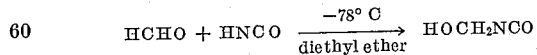

A. A three-necked 500-ml. flask equipped with a paddle stirrer is charged with 70 ml. of sodium-dried diethyl ether and cooled to −78° C. in a bath containing an acetone-solid carbon dioxide mixture. Isocyanic acid (39.2 g., 0.91 mole) is then added under a nitrogen blanket to exclude moisture. Monomeric formaldehyde is generated by heating α-polyoxymethylene (30 g., 1.0 mole) in a round bottom flask which is equipped with an inlet for nitrogen and an outlet connected with the vessel containing the isocyanic acid. The monomeric formaldehyde is swept from the generator into the isocyanic acid solution by means of a slow nitrogen stream. A trap cooled to −15° C. is interposed between the monomeric formaldehyde generator and the isocyanic acid container to effect some purification of the monomeric formaldehyde. After approximately one and three-quarter hours all of the α-polyoxymethylene has been converted to monomeric formaldehyde and the reactor containing the isocyanic acid solution is disconnected. Analysis of the clear solution, at this point, by infrared shows a strong OH band. Removal of the diethyl ether by distillation at −30° C./5–4.5 mm., leaves 69.5 g. of hydroxymethyl isocyanate, a mobile liquid at −30° C.

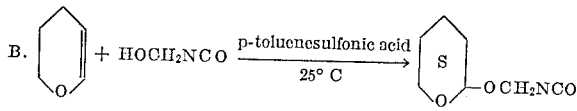

To 32 g. (0.38 mole) of dihydropyran and 0.5 g. of p-toluenesulfonic acid, there is added 12.0 g. (0.17 mole) of hydroxymethyl isocyanate, prepared as described above, at −20° C. The temperature of the reaction mixture is permitted to attain room temperature (ca. 25° C.) over a period of two hours. After standing at room temperature for six days, infrared shows that virtually all the OH groups have disappeared. On distillation, 15.0 g. of 2-tetrahydropyranyloxymethyl isocyanate, B.P. 39° to 40° C./10.5 mm., is obtained. Redistillation yields a fraction boiling at 33° C./0.2 mm., $n_D^{25}$ 1.4501, which analyzes:

*Analysis.*—Calcd. for $C_7H_{11}NO_3$: C, 53.48%; H, 7.05%; N, 8.91%. Found: C, 53.99%; H, 7.12%; N, 8.91%, 9.20%.

Infrared analysis is consistent with the structure of 2-tetrahydropyranyloxymethyl isocyanate.

The above experiment is repeated using a charge consisting of 400 g. of dihydropyran, 0.5 g. of p-toluenesulfonic acid, 157 g. of sodium-dried diethyl ether, and 135 g. of hydroxymethyl isocyanate at 5° C. The reaction mixture is allowed to stand at room temperature (ca. 25° C.) for ten days and the liquid product is then distilled. There is obtained 188 g. of 2-tetrahydropyranyloxymethyl isocyanate, B.P. 87–88° C./15 mm., $n_D^{25}$ 1.4499.

EXAMPLE II

Following the procedure described in Example I, the reactor is charged with 250 g. of n-butyl vinyl ether, 0.5 g. of p-toluenesulfonic acid, and 185 g. of sodium-dried diethyl ether. To this solution there is added, at 10° C., hydroxymethyl isocyanate (146 g.), whereupon an exothermic rise in temperature from 25° to 30° C. occurs. The reaction mixture is allowed to stand at 25° C. for five days and is then filtered. The solid on the filter weighs 109 g. The filtrate is then fractionally distilled. There is thus obtained 93 g. of 1-n-butoxyethoxymethyl isocyanate,

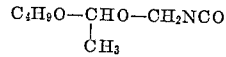

B.P. 85°–87° C./16 mm.; $n_D^{25}$, 1.4192. The product analyzes:

*Analysis.*—Calcd. for $C_8H_{15}O_3N$: C, 55.47%; H, 8.73%; N, 8.09%. Found: C, 56.02%, 56.17%; H, 8.89%, 9.11%; N, 8.25%.

In the right column of Table I are listed the products that are obtained by substituting the unsaturated ethers in the left column for dihydropyran in the process of Example I.

Table I

| Monoethylenically Unsaturated Ether | Product |
|---|---|
| n-Octyl vinyl ether | 1-n-octyloxyethoxymethyl isocyanate. |
| n-Octadecyl vinyl ether | 1-n-octadecyloxyethoxymethyl isocyanate. |
| 5-butyltetradecyl vinyl ether | 1-(5-butyltetradecyloxyethoxymethyl) isocyanate. |
| 2-methylpropyl pent-1-enyl ether | 1-(2-methylpropoxypentoxymethyl) isocyanate. |
| αβ-Dihydrofuran | 2-tetrahydrofuronyloxymethyl isocyanate. |

The α-cyanatomethoxy ethers of this invention are of interest as chemical intermediates for the preparation of carbamates which are useful as aphicides and/or insect repellants as illustrated by the following examples.

EXAMPLE A

A mixture consisting of 21.6 g. of α-naphthol, 23.5 g. of tetrahydropyranyloxymethyl isocyanate, prepared as in Example I, 125 ml. of sodium-dried diethyl ether, and 1 g. of pyridine is refluxed for four hours at 37° C. Thereafter the diethyl ether is removed by distillation at 30° C./1 mm. Upon cooling to room temperature, the viscous residue crystallizes. The crystalline product, N-(2-tetrahydropyranyloxymethyl)-α-naphthyl carbamate, analyzes:

*Analysis.*—Calcd. for $C_{17}H_{19}O_2N$: C, 67.7%; H, 6.36%; N, 4.65%. Found: C, 66.92%; H, 6.53%; N, 4.80%.

This product caused complete mortality of bean aphids on nasturtiums when applied at 0.2% concentration.

Substitution of 3-hydroxypyridine, (3-pyridinol), for the α-naphthol in the process of the above example produces a carbamate which causes complete mortality of bean aphids on nasturtiums when applied in the manner described for the carbamate prepared from the α-naphthol.

EXAMPLE B

A mixture of 100 ml. of tert.-butyl alcohol, 34.6 g. of 1-n-butoxyethoxymethyl isocyanate, prepared as in Example II, and 1 ml. of pyridine is refluxed for six hours. Thereafter, volatile products are removed by distillation to 40° C./1 mm., leaving a light yellow oil. Analysis of the yellow oil indicated that it was an approximately 60/40 mixture of carbamates, N-(1-n-butoxyethoxymethyl)-tert.-butyl carbamate

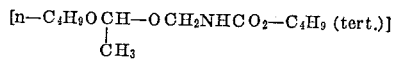

and N-(n-butoxymethyl)-tert.-butyl carbamate

Both of these novel carbamates are useful as insect repellants. Conveniently, they are employed as a mixture because they are simultaneously produced by the above method. For example, roaches and other vermin were observed to be repelled from an area sprayed with a solution composed of a 1% concentration of the above mixture in an inert solvent.

The α-cyanatomethoxy ethers of this invention are also useful as stabilizers for polymers containing active hydrogen. For example, they function as end group cappers when mixed with polyoxymethylene. Moreover, these isocyanates are useful intermediates for the preparation of carbodiimides by known methods. The resultant carbodiimides polymerize spontaneously upon standing. Such polymers are useful as water insoluble coatings for applications where such coatings are commonly employed.

Since obvious modifications and equivalents in the invention will be evident to those skilled in the chemical arts, we propose to be bound solely by the appended claims.

The embodiments of the invention in which an exclusive property or privilege is claimed are defined as follows:
1. Compounds of the formula:

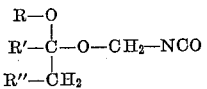

wherein R is saturated hydrocarbon of up to 18 carbons, each of R' and R" is selected from the group consisting of hydrogen and saturated hydrocarbon of up to 18 carbons, and R and R" joined together with the oxygen are a cyclomonooxaalkyl group of 5–6 members and a total of up to 18 carbons.
2. 2-tetrahydropyranyloxymethyl isocyanate.
3. 1-n-butoxyethoxymethyl isocyanate.
4. A compound as set forth in claim 1 wherein R is alkyl of up to 18 carbons and each of R' and R" is hydrogen.
5. A compound as set forth in claim 1 wherein R' is hydrogen and R and R" are joined together to form with the oxygen a cyclomonooxaalkyl group of 5–6 ring members.
6. 1-n-octyloxyethoxymethyl isocyanate.
7. 1-n-octadecyloxyethoxymethyl isocyanate.
8. 1-(5-butyltetradecyloxyethoxymethyl) isocyanate.
9. 1-(2-methylpropoxypentoxymethyl) isocyanate.
10. 2-tetrahydrofuronyloxymethyl isocyanate.

References Cited in the file of this patent
UNITED STATES PATENTS

| | | |
|---|---|---|
| 2,625,561 | Wervtz | Jan. 13, 1953 |
| 2,656,378 | Gerger et al. | Oct. 20, 1953 |
| 2,683,730 | Seeger et al. | July 13, 1954 |
| 2,871,259 | Levy | Jan. 27, 1959 |
| 3,076,788 | Hoover | Feb. 5, 1963 |

FOREIGN PATENTS

| | | |
|---|---|---|
| 763,636 | Great Britain | Dec. 12, 1956 |

OTHER REFERENCES

Noller: Chemistry of Organic Compounds, 2nd ed., pp. 131 and 138, W. B. Saunders Co., Phila. (1957), QD 253.N65.